(12) United States Patent
Nakamura et al.

(10) Patent No.: US 12,275,539 B2
(45) Date of Patent: Apr. 15, 2025

(54) METHOD OF CONTROLLING TRAVELING OF PASSENGER BOARDING BRIDGE

(71) Applicant: SHINMAYWA INDUSTRIES, LTD., Takarazuka (JP)

(72) Inventors: Taichi Nakamura, Takarazuka (JP); Takashi Kunitake, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 861 days.

(21) Appl. No.: 17/437,561

(22) PCT Filed: Dec. 19, 2019

(86) PCT No.: PCT/JP2019/049860
§ 371 (c)(1),
(2) Date: Sep. 9, 2021

(87) PCT Pub. No.: WO2020/194933
PCT Pub. Date: Oct. 1, 2020

(65) Prior Publication Data
US 2022/0135249 A1   May 5, 2022

(30) Foreign Application Priority Data
Mar. 25, 2019 (JP) .................. 2019-056151

(51) Int. Cl.
*B64F 1/305*    (2006.01)
(52) U.S. Cl.
CPC .................. *B64F 1/305* (2013.01)

(58) Field of Classification Search
CPC ....................................................... B64F 1/305
(Continued)

(56) References Cited

U.S. PATENT DOCUMENTS 3,683,440 A * 8/1972 Xenakis ................ B64F 1/3055
14/71.5
2003/0208861 A1* 11/2003 Hutton .................. B64F 1/3055
14/71.5
(Continued)

FOREIGN PATENT DOCUMENTS

ES        2357223 B1 * 1/2012  ............. B64F 1/305
JP     2002037196 A    2/2002
(Continued)

*Primary Examiner* — Raymond W Addie
(74) *Attorney, Agent, or Firm* — Alleman Hall & Tuttle LLP

(57) ABSTRACT

A passenger boarding bridge includes: a rotunda rotatable about a vertical axis; a tunnel unit; a cab; a lifting/lowering mechanism; and a travel unit. A control method includes, at a time of docking the cab with an entrance of an aircraft: calculating relative positional information indicating a position of the entrance as seen from the cab when the travel unit is at a movement start position; calculating positional information of a destination position based on the movement start position and the relative positional information in a case where a distance from the movement start position to the destination position is less than a horizontal distance from the vertical axis to a center point of the travel unit; calculating a target travel angle; and controlling the travel unit such that a travel angle of the travel unit is kept to the target travel angle during traveling.

7 Claims, 9 Drawing Sheets

(58) Field of Classification Search
USPC ........................................................ 14/71.5
See application file for complete search history.

(56) References Cited

U.S. PATENT DOCUMENTS

| | | | | |
|---|---|---|---|---|
| 2005/0198750 A1* | 9/2005 | Spencer | ............... | B64F 1/3055 |
| | | | | 14/71.5 |
| 2007/0210952 A1* | 9/2007 | Hutton | ................ | G08G 5/0013 |
| | | | | 342/23 |
| 2008/0098537 A1* | 5/2008 | Hutton | ................... | B64F 1/305 |
| | | | | 14/71.5 |
| 2008/0098538 A1* | 5/2008 | Hutton | ................ | B64F 1/3055 |
| | | | | 14/71.5 |
| 2020/0165009 A1 | 5/2020 | Sonoda | | |
| 2024/0101275 A1* | 3/2024 | Akegami | ............. | B64F 1/3055 |

FOREIGN PATENT DOCUMENTS

| | | |
|---|---|---|
| JP | 2005104193 A | 4/2005 |
| WO | 2019012648 A1 | 1/2019 |

* cited by examiner

METHOD OF CONTROLLING TRAVELING OF PASSENGER BOARDING BRIDGE

TECHNICAL FIELD

The present invention relates to a method of controlling traveling of a passenger boarding bridge.

BACKGROUND ART

At an airport, a passenger boarding bridge that connects between a terminal building and an aircraft is used for boarding onto and disembarking from the aircraft. It has been proposed to automatically move such a passenger boarding bridge (see Patent Literatures 1 and 2, for example).

FIG. 8 is a schematic plan view of a conventional passenger boarding bridge.

The conventional passenger boarding bridge includes: a rotunda 4 connected to an entrance of the terminal building and supported such that the rotunda 4 is horizontally rotatable about a vertical rotational axis CL1; a tunnel unit 5, whose proximal end is connected to the rotunda 4 in such a manner that the tunnel unit 5 is liftable and lowerable, the tunnel unit 5 being configured to be extendable and retractable; a cab 6 provided at the distal end of the tunnel unit 5 and rotatable about a rotational axis CL2; and drive columns 8 provided at the distal end side of the tunnel unit 5 and configured to support the tunnel unit 5. The tunnel unit 5 includes a plurality of tunnels 5a and 5b, which are fitted together in a telescopic manner such that the tunnel unit 5 is extendable and retractable.

The drive columns 8 are provided with a lifting/lowering mechanism 10, which moves the tunnel unit 5 upward and downward. By moving the tunnel unit 5 upward and downward by the lifting/lowering mechanism 10, the tunnel unit 5 can be swung vertically with respect to the rotunda 4, which serves as a proximal end. The drive columns 8 are, at the lower part thereof, provided with a travel unit 12 including two drive wheels 9, each of which can be independently driven to rotate in regular and reverse directions. The travel unit 12 is configured to travel forward and backward by the rotation of the two drive wheels 9, and be rotatable in regular and reverse directions about a rotational axis CL3, which passes through the center point of the travel unit 12 (the center point of the two drive wheels 9).

The passenger boarding bridge is further provided with: an angle sensor that detects a rotational angle $\theta_R$ of the rotunda 4 (i.e., a rotunda angle sensor); an angle sensor that detects a rotational angle $\Phi_C$ of the cab 6 relative to the tunnel unit 5 (i.e., a cab angle sensor); and an angle sensor that detects a rotational angle $\Phi_W$ of the travel unit 12 relative to the tunnel unit 5 (i.e., a travel unit angle sensor). The passenger boarding bridge is further provided with an inclination angle measurer and a horizontal distance measurer. The inclination angle measurer measures an inclination angle β (see FIG. 2) of the tunnel unit 5 relative to a horizontal plane. The horizontal distance measurer measures a horizontal distance LW (a rotunda-to-travel unit horizontal distance) from the center point of the rotunda 4 (the center point is located on the rotational axis CL1) to the center point of the travel unit 12. The inclination angle measurer and the horizontal distance measurer are configured as, for example, a distance meter that measures the amount of lifting/lowering of the tunnel unit 5 by the lifting/lowering mechanism 10 and a distance meter that measures the length of the tunnel unit 5, respectively.

To calculate the position of each part of the passenger boarding bridge, an XYZ orthogonal coordinate system as shown in FIG. 8 is used. Specifically, as absolute coordinates, the intersection point of the rotational axis CL1 of the rotunda 4 and the plane of the apron is taken as the origin (0, 0, 0), and the X-axis, the Y-axis, and the Z-axis (which extends vertically) are set with respect to the origin as shown in FIG. 8.

For example, in the case of moving the above-described passenger boarding bridge by automatic control from a standby position shown in FIG. 8 to a docking position at which the cab 6 is to be docked with an aircraft 3, the travel unit 12 is controlled as described below. Hereinafter, the standby position of the travel unit 12 is referred to as P3, and a destination target position (e.g., the docking position) is referred to as P31. In the case of moving the travel unit 12 by automatic control from the standby position P3 to the target position P31, a control device (not shown) first causes the left and right drive wheels 9 to rotate on the spot in opposite directions to each other to correct the facing direction of the drive wheels 9, such that the travel direction of the travel unit 12 is adjusted to a direction from the standby position P3 toward the target position P31 (FIG. 8 shows the drive wheels 9 whose facing direction has been corrected). Thereafter, the control device causes the travel unit 12 to travel straight from the standby position P3 toward the target position P31.

In the case of causing the travel unit 12 to travel straight, even if the rotation speeds of the left and right drive wheels 9 are equalized, in reality, straight traveling cannot be achieved due to, for example, factors such as a sloped road surface and imbalance between the left-side weight and the right-side weight of the travel unit 12.

Therefore, during traveling, the rotation speed of each of the two drive wheels 9 is adjusted. For example, during traveling, based on the rotational angle $\theta_R$ of the rotunda 4, which is detected by the rotunda angle sensor, and the rotunda-to-travel unit horizontal distance LW, which is measured by the horizontal distance measurer, the current position (coordinates) of the center point of the travel unit 12 (the center point is a predetermined point on the rotational axis CL3) is calculated at predetermined time intervals, and a discrepancy between the calculated current position and a scheduled current position (i.e., a positional discrepancy) is calculated. Further, a current travel angle indicating the current travel direction of the travel unit 12 is calculated, and a discrepancy between the calculated current travel angle and an angle indicating a target travel direction (i.e., a direction angle discrepancy) is calculated. Then, feedback control of adjusting the rotation speed of each of the two drive wheels 9 is performed to reduce these discrepancies.

The scheduled current position is a position that is on a target travel path R1 and that is calculated at the current time point based on a preset travel speed. The target travel path R1 is a linear path from the standby position P3 to the target position P31. The target travel direction is a direction extending linearly from the standby position P3 toward the target position P31. The target travel direction is the same as the direction in which the target travel path R1 extends.

In a case where the rotunda-to-travel unit horizontal distance LW and the rotational angle $\theta_R$ of the rotunda 4 at a certain time point t during traveling are $LW_t$ and $\theta_{Rt}$, respectively, current position coordinates $(X_t, Y_t)$ of the center point of the travel unit 12 at the time point t are calculated by using formulas shown below.

$X_t = LW_t \cdot \cos \theta_{Rt}$ $Y_t = LW_t \cdot \sin \theta_{Rt}$

In a case where the rotational angle $\Phi_W$ of the travel unit 12 at the time point t is $\Phi_{Wt}$, and a travel angle $\theta_W$ indicating the travel direction of the travel unit 12 at the time point t is $\theta_{Wt}$, the travel angle $\theta_{Wt}$ is calculated as $\theta_{Wt}=\theta_{Rt}+\Phi_{Wt}$.

It should be noted that the travel angle $\theta_W$ indicating the travel direction of the travel unit 12 is an angle (an absolute angle on the plane of the apron) formed by the travel direction and a particular direction (e.g., the X-axis positive direction). The travel angle $\theta_W$ satisfies the following relationship: $\theta_W=\theta_R+\Phi_W$.

A target travel angle $\theta_T$ is an angle (an absolute angle on the plane of the apron) formed by the target travel direction (the direction in which the target travel path R1 extends) and a particular direction (e.g., the X-axis positive direction). FIG. 8 shows a case where the travel angle $\theta_W$ of the travel unit 12 is equal to the target travel angle $\theta_T$.

In the above feedback control, based on actual current position coordinates $(X_t, Y_t)$ at a certain time point t, the actual current position coordinates $(X_t, Y_t)$ being calculated at predetermined time intervals, and scheduled current position coordinates $(X_{0t}, Y_{0t})$ at the time point t in a case where the travel unit 12 travels on the target travel path R1 as scheduled, the rotation speed of each of the two drive wheels 9 is adjusted, such that a discrepancy between the actual current position coordinates $(X_t, Y_t)$ and the scheduled current position coordinates $(X_{0t}, Y_{0t})$ (i.e., a positional discrepancy) is reduced, i.e., such that the actual position is brought closer to the scheduled position. More specifically, for example, the positional discrepancy is separated into a first positional discrepancy in the target travel direction indicated by the target travel angle $\theta_T$ and a second positional discrepancy in a direction orthogonal to the target travel direction, and the rotation speed of each of the two drive wheels 9 is adjusted such that each of these positional discrepancies is reduced.

Further, in the above feedback control, the rotation speed of each of the two drive wheels 9 is adjusted such that a discrepancy between the actual travel angle $\theta_{Wt}$ and the target travel angle $\theta_T$ (i.e., a direction angle discrepancy) is reduced.

In this case, the feedback control to adjust the rotation speed of each of the two drive wheels 9 is performed by, for example, weighting the three discrepancies, i.e., the first positional discrepancy, the second positional discrepancy, and the direction angle discrepancy.

CITATION LIST

Patent Literature

PTL 1: Japanese Laid-Open Patent Application Publication No. 2002-37196
PTL 2: Japanese Laid-Open Patent Application Publication No. 2005-104193

SUMMARY OF INVENTION

Technical Problem

Assuming that the above feedback control is performed ideally and there is no control deviation, then according to the control calculation, the center point of the travel unit 12 moves on the target travel path R1. That is, the control device recognizes that the center point of the travel unit 12 is moving on the target travel path R1. However, in reality, the actual travel path deviates from the target travel path R1. This is caused mainly by measurement errors due to the linearity and resolution of the rotunda angle sensor, which detects the rotational angle of the rotunda 4.

FIG. 9A shows one example of a relationship between an angle measured by the rotunda angle sensor and an actual angle (true angle). In this example, a time point when the measured angle is an angle $\theta_{R0}$ is assumed as a time point when the travel unit 12 starts traveling. When the measured angle is, for example, $\theta_{R1}$, $\theta_{R2}$, or $\theta_{R3}$, there is a measurement error $\Delta\theta_{R1}$, $\Delta\theta_{R2}$, or $\Delta\theta_{R3}$, respectively, from the actual angle.

FIG. 9B shows one example of a travel path of the drive wheels 9 of the travel unit 12 when there are measurement errors between the measured angle and the actual angle as indicated by errors $\Delta\theta_{R1}$, $\Delta\theta_{R2}$, and $\Delta\theta_{R3}$ in FIG. 9A. In FIG. 9B, unhatched rectangles represent the positions of the respective left and right drive wheels 9 according to the control calculation, and hatched rectangles represent actual positions of the respective left and right drive wheels 9. In this example, at a time point when the travel unit 12 starts traveling (i.e., when the travel unit 12 is at the standby position), the measured angle and the actual angle are both $\theta_{R0}$, and the positions of the respective drive wheels 9 according to the control calculation coincide with the actual positions of the respective drive wheels 9. However, in reality, in some cases, there is a measurement error from the actual angle.

Even in the aforementioned case where the feedback control is ideally performed on the linear target travel path R1 and thereby the center point of the travel unit 12 moves on the target travel path R1 according to the control calculation, an actual travel path R2 deviates from the target travel path R1 due to the measurement errors $\Delta\theta_R$ of the rotunda angle sensor.

The amount of positional deviation between a travel position (the position of the center point of the travel unit 12) according to the control calculation and an actual travel position at a certain time point during traveling is substantially proportional to the product of the rotunda-to-travel unit horizontal distance LW and the measurement error $\Delta\theta_R$ at the time point. Here, the amount of positional deviation due to the measurement error $\Delta\theta_R$ is great since the rotunda-to-travel unit horizontal distance LW is about 10 to 45 m, which is a relatively great distance.

As shown in FIG. 9A, the measurement error $\Delta\theta_R$ varies. Accordingly, in a case where the travel unit 12 reaches, for example, a target position such as a docking position when the absolute value of the measurement error $\Delta\theta_R$ is great, the amount of positional deviation from the target docking position is great, which may cause a problem in that the cab 6 cannot be properly docked with the aircraft 3.

The present invention has been made to solve the above-described problems. An object of the present invention is to provide a method of controlling traveling of a passenger boarding bridge, the method making it possible to cause a travel unit of the passenger boarding bridge to properly perform straight traveling from a movement start position to a destination position.

Solution to Problem

In order to achieve the above-described object, a method of controlling traveling of a passenger boarding bridge according to one aspect of the present invention is a method of controlling traveling of a passenger boarding bridge, the passenger boarding bridge including: a rotunda connected to a terminal building and rotatable in regular and reverse directions about a vertical axis; a tunnel unit whose proximal end is connected to the rotunda in such a manner that the tunnel unit is liftable and lowerable, the tunnel unit being configured to be extendable and retractable in a longitudinal direction; a cab rotatably provided at a distal end of the tunnel unit; a lifting/lowering mechanism mounted to the tunnel unit or the cab and configured to lift and lower the tunnel unit or the cab; a travel unit mounted below the lifting/lowering mechanism, the travel unit being configured to travel on a ground and rotate in regular and reverse directions about an axis that passes through a center point of the travel unit, such that a travel direction of the travel unit is changeable; a rotunda angle sensor that detects a rotational angle of the rotunda; a travel unit angle sensor that detects a rotational angle of the travel unit; a horizontal distance measurer that measures a horizontal distance from the vertical axis to the center point of the travel unit; and an inclination angle measurer that measures an inclination angle of the tunnel unit relative to a horizontal plane. The method includes, at a time of docking the cab with an entrance of an aircraft: a step of calculating relative positional information indicating a position of the entrance as seen from the cab when the travel unit is at a movement start position; a step of calculating positional information of a destination position, the destination position being a position to which the travel unit is moved for docking the cab with the entrance, based on positional information of the travel unit at the movement start position and the relative positional information of the entrance in a case where a distance from the movement start position to the destination position is in a predetermined state in which the distance is less than the horizontal distance from the vertical axis to the center point of the travel unit at the movement start position; a step of calculating a target travel angle that is an angle formed by a direction extending linearly from the movement start position toward the destination position and a particular direction; and a traveling step of: causing the travel unit to travel from the movement start position toward the destination position; calculating, at predetermined time intervals during traveling of the travel unit, a travel angle that is an angle formed by a current travel direction of the travel unit and the particular direction; and controlling the travel unit only such that the travel angle is kept to the target travel angle. The step of calculating the positional information of the destination position includes calculating positional information of the movement start position based on the horizontal distance from the vertical axis to the center point of the travel unit, the horizontal distance being measured by the horizontal distance measurer, the rotational angle of the rotunda detected by the rotunda angle sensor, and the inclination angle measured by the inclination angle measurer. The traveling step includes calculating the travel angle based on the rotational angle of the travel unit detected by the travel unit angle sensor and the rotational angle of the rotunda detected by the rotunda angle sensor.

According to the above method of controlling traveling of a passenger boarding bridge, when the travel unit is at the movement start position, in a case where a distance (distance A) from the movement start position to the destination position is in the predetermined state, in which the distance A is less than the horizontal distance (distance B) from the rotational center (the vertical axis) of the rotunda to the center point of the travel unit, the positional information of the destination position is calculated, and during the traveling of the travel unit, the travel angle is calculated at predetermined time intervals, and the travel unit is controlled only such that the travel angle is kept to the target travel angle. At the time of performing the control, the positional discrepancy between the current position of the travel unit, the calculation of which is significantly affected by a measurement error of the rotunda angle sensor, and a scheduled current position of the travel unit on a target travel path (a path linearly connecting between the movement start position and the destination position) is not taken into account, but only the travel angle is taken into account as described above in a case where the distance A is less than the distance B. This makes it possible to reduce the amount of positional deviation of the travel unit from the target travel path and cause the travel unit to travel straight properly from the movement start position to the destination position. It should be noted that the movement start position may be a position of the travel unit after the travel unit has been moved by any means or by any cause, or may be a position that the travel unit passes while moving.

The destination position may be a position of the travel unit when the cab is docked with the entrance.

The step of calculating the relative positional information may include: detecting the entrance based on an image of the entrance, the image being captured by a camera mounted to the cab; and calculating the relative positional information of the detected entrance.

The travel unit may include two drive wheels that are arranged parallel to each other, with the center point of the travel unit positioned therebetween, the two drive wheels being drivable to rotate independently of each other. The traveling step may include controlling the travel unit by adjusting a rotation speed of each of the two drive wheels.

In the step of calculating the positional information of the destination position, the predetermined state may be a state in which the distance from the movement start position to the destination position is less than or equal to a predetermined distance that is less than the horizontal distance from the vertical axis to the center point of the travel unit in a case where the tunnel unit is fully retracted.

Advantageous Effects of Invention

The present invention is configured as described above, and has an advantage of being able to provide a method of controlling traveling of a passenger boarding bridge, the method making it possible to cause a travel unit of the passenger boarding bridge to properly perform straight traveling from a movement start position to a destination position.

DESCRIPTION OF EMBODIMENTS

Figure 1:
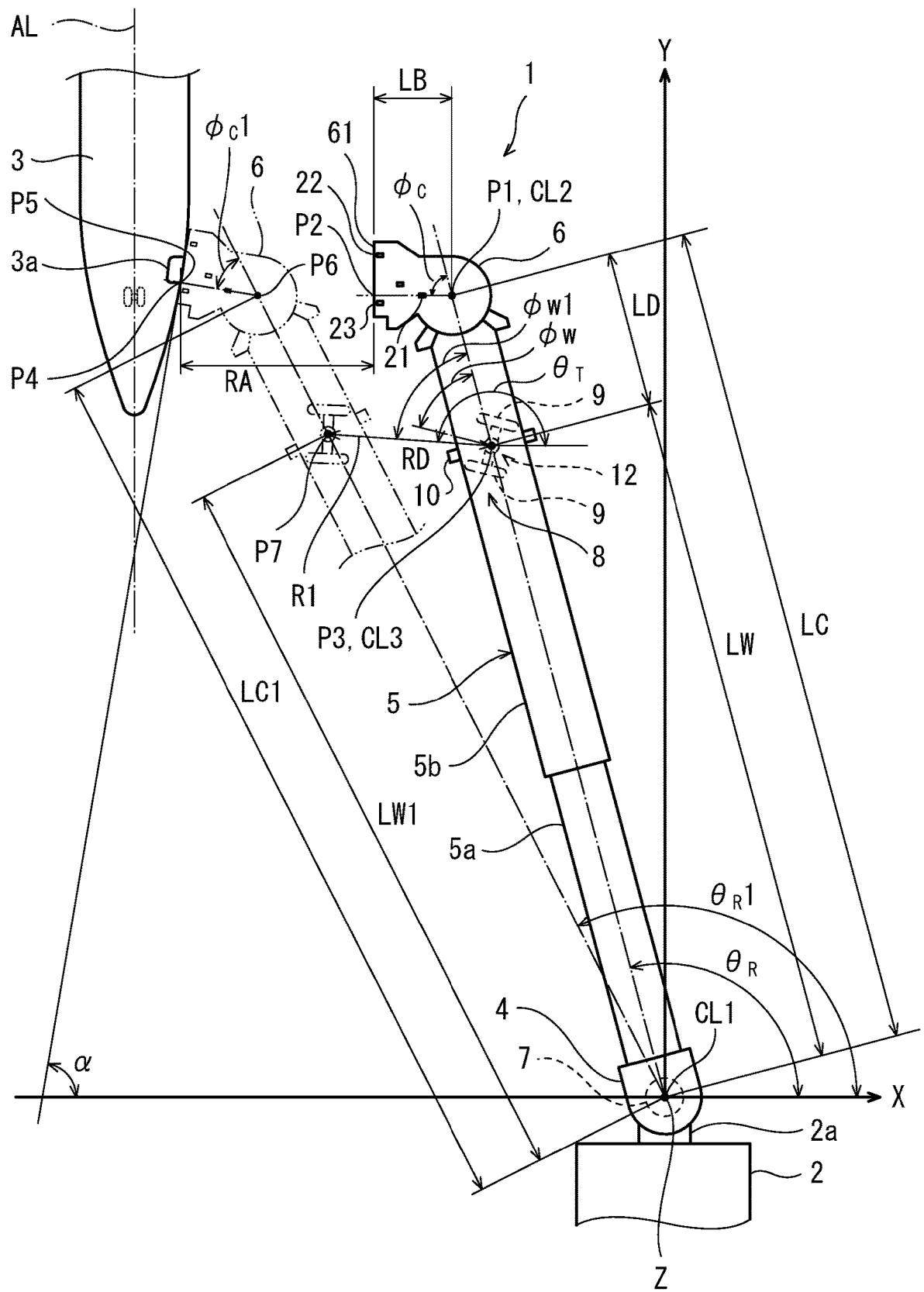
FIG. 1 is a schematic plan view showing one example of a passenger boarding bridge according to an embodiment of the present invention.

Hereinafter, preferred embodiments of the present invention are described with reference to the drawings. In the drawings, the same or corresponding elements are denoted by the same reference signs, and repeating the same descriptions is avoided below. The present invention is not limited to the embodiments described below.

EMBODIMENTS

Figure 2:
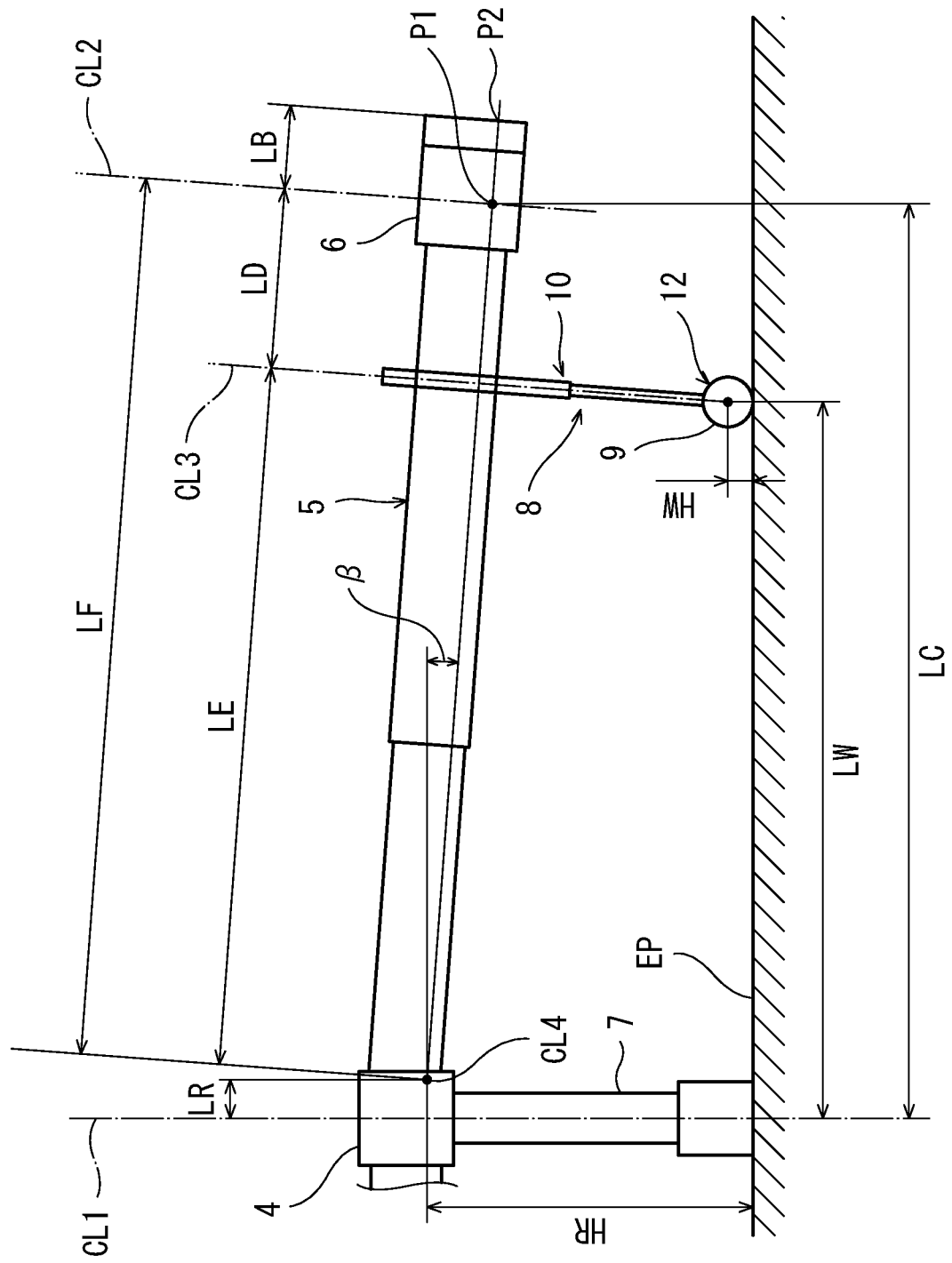
FIG. 2 is a side view schematically showing the passenger boarding bridge.
Figure 3:
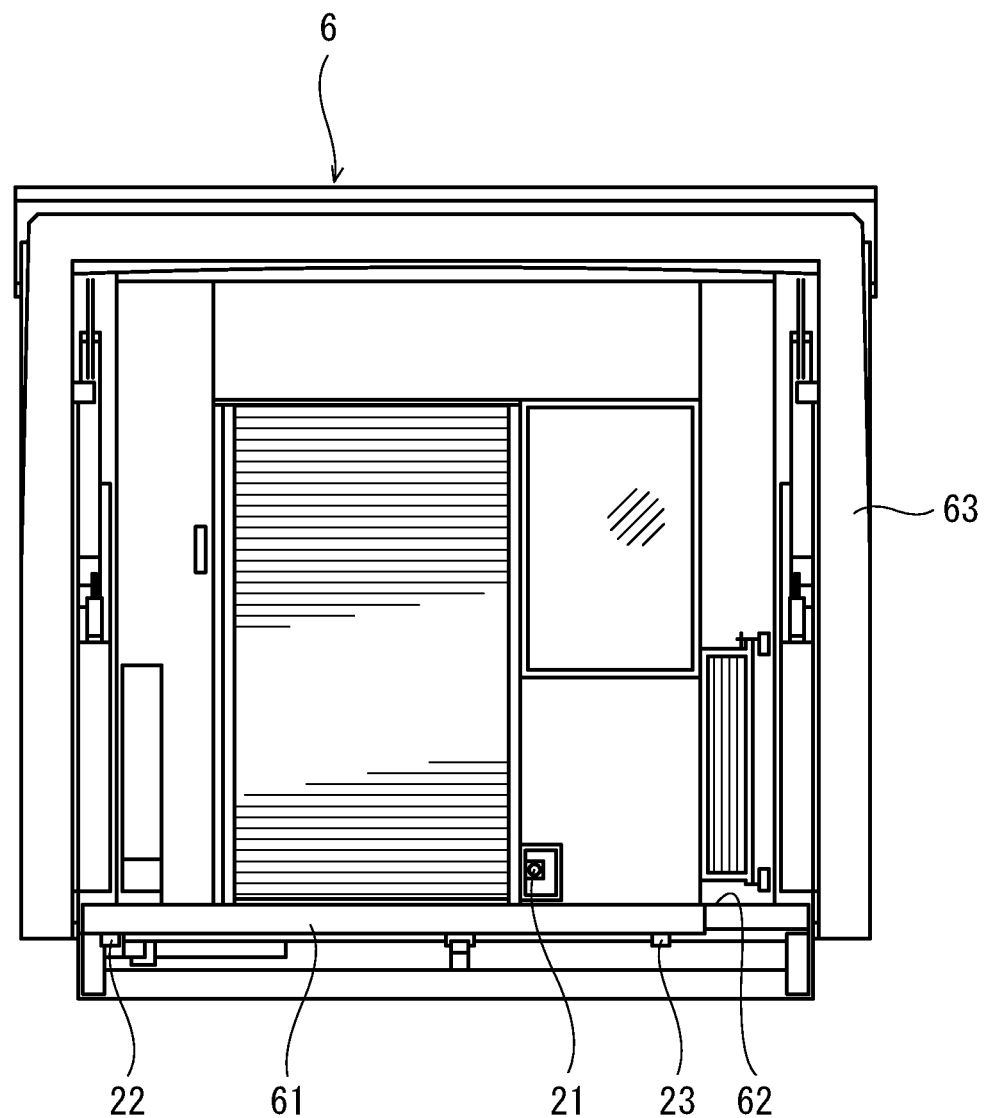
FIG. 3 is a front view of the distal end part of a cab to be docked with an aircraft.
Figure 4:
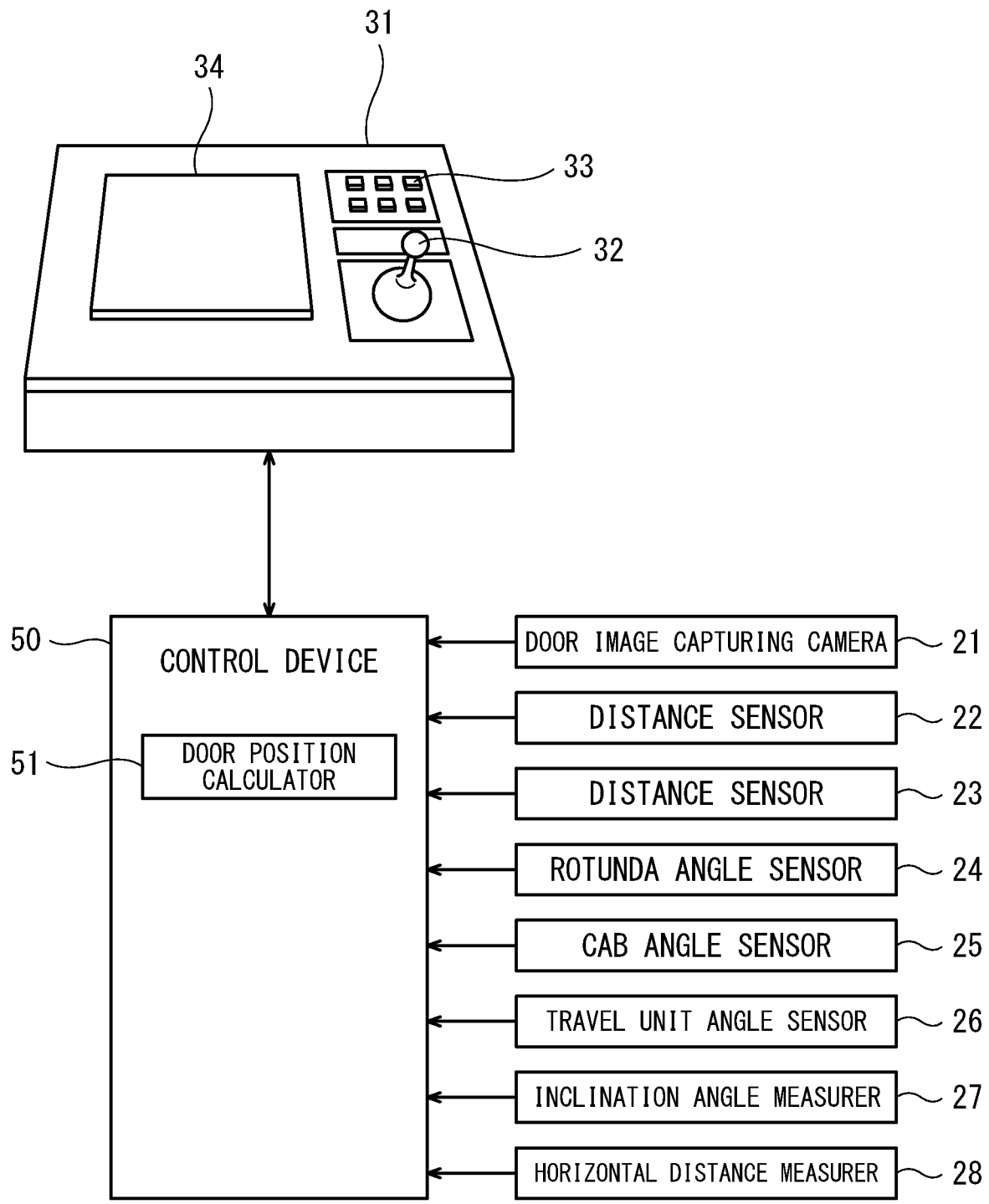
FIG. 4 shows one example of an operation panel, etc.

FIG. 1 is a schematic plan view showing one example of a passenger boarding bridge according to an embodiment. FIG. 2 is a side view schematically showing the passenger boarding bridge of FIG. 1. FIG. 3 is a front view of the distal end part of a cab to be docked with an aircraft (the front view is taken from the aircraft side). FIG. 4 shows one example of an operation panel, etc.

A method of controlling traveling of a passenger boarding bridge according to the present embodiment is applicable to a passenger boarding bridge 1. The passenger boarding bridge 1 includes: a horizontally rotatable rotunda (proximal-end round room) 4 connected to an entrance 2*a* of a terminal building 2 of an airport; a tunnel unit 5, whose proximal end is connected to the rotunda 4 in such a manner that the tunnel unit 5 is liftable and lowerable, the tunnel unit 5 being configured to be extendable and retractable in the longitudinal direction; a cab (distal-end round room) 6 provided at the distal end of the tunnel unit 5 in such a manner that the cab 6 is rotatable in regular and reverse directions; and drive columns 8.

The rotunda 4 is supported by a support pillar 7, such that the rotunda 4 is rotatable in regular and reverse directions about a rotational axis (vertical axis) CL1.

The tunnel unit 5 is an extendable/retractable tubular unit forming a connecting passageway that connects between the entrance 2*a* of the terminal building 2 and a door 3*a* of an aircraft 3. The tunnel unit 5 includes a plurality of tunnels 5*a* and 5*b*, which are fitted together in a telescopic manner (nested manner), such that the tunnels 5*a* and 5*b* are extendable and retractable in the longitudinal direction. Consequently the entire tunnel unit 5 is extendable and retractable. In the description herein, the tunnel unit 5 is formed by the two tunnels 5*a* and 5*b* as one example. The tunnel unit 5 is formed by at least two tunnels. The proximal end part of the tunnel unit 5 is connected to the rotunda 4 in such a manner that the proximal end part is swingable (vertically) about a horizontal rotational axis CL4 (see FIG. 2). That is, the proximal end part of the tunnel unit 5 is connected to the rotunda 4 in such a manner that the tunnel unit 5 is liftable and lowerable.

The distal side of the tunnel unit 5 (specifically, the tunnel 5*b*, which is the frontmost tunnel) is provided with the drive columns 8, which serve as support legs. The drive columns 8 are provided with a lifting/lowering mechanism 10, which moves the cab 6 and the tunnel unit 5 upward and downward (i.e., lifts and lowers the cab 6 and the tunnel unit 5). By moving the tunnel unit 5 upward and downward by the lifting/lowering mechanism 10, the cab 6 and the tunnel unit 5 can be swung vertically with respect to the rotunda 4, which serves as a proximal end.

The drive columns 8 are provided with a travel unit 12 including a pair of drive wheels 9. The travel unit 12 is mounted below the lifting/lowering mechanism 10. The travel unit 12 is configured to travel forward and backward by the rotation of the two drive wheels 9. The travel unit 12 is also configured to be rotatable in regular and reverse directions about a vertical rotational axis (center axis) CL3, which passes through the center point of the travel unit 12 (the center point of the two drive wheels 9), such that the rudder angle is changeable within the range of −90° to +90° relative to the longitudinal direction of the tunnel unit 5. The travel direction of the travel unit 12 is changeable. Specifically, the two drive wheels 9 are arranged parallel to each other, with the center point of the travel unit 12 positioned therebetween. The two drive wheels 9 are drivable to rotate independently of each other. The two drive wheels 9 are configured to be swingable so that the drive wheels 9 can roll with respect to a travel direction (a roll axis) that passes through the center point of the drive wheels 9 (i.e., the center point of the travel unit 12). As a result of the travel unit 12 (the drive wheels 9) traveling on the ground, the tunnel unit 5 can be rotated about the rotational axis CL1 and the tunnel unit 5 can be extended/retracted. It should be noted that the drive columns 8 may be provided not on the tunnel 5*b*, but on the cab 6.

The cab 6 is provided at the distal end of the tunnel unit 5. The cab 6 is configured to be rotatable, by means of an unshown rotational mechanism, in regular and reverse directions about a rotational axis CL2, which is perpendicular to the floor surface of the cab 6. Since the cab 6 is thus mounted to the distal end of the tunnel unit 5, the cab 6 can also be swung vertically together with the tunnel unit 5 by the lifting/lowering mechanism 10 of the drive columns 8 with respect to the rotunda 4, which serves as the proximal end.

As shown in FIG. 1 and FIG. 3, a door image capturing camera (entrance image capturing camera) 21 for capturing an image of the door 3*a* of the aircraft 3 is installed in the distal end part of the cab 6 at a position slightly above the surface of the floor of the distal end part of the cab 6. For example, an IP camera is used as the camera 21. In this example, the installation position and the image-capturing direction of the camera 21 are fixed in relation to the cab 6. Alternatively, the camera 21 may be configured such that the image-capturing direction of the camera 21 is controllable or changeable in relation to the cab, and/or the angle of view of the camera 21 is adjustable. In addition, a plurality of (in this example, two) distance sensors 22 and 23 (e.g., laser distance meters), each of which detects the distance between the cab 6 and the aircraft 3 (e.g., a distance RA shown in FIG. 1), are mounted to a bumper 61 provided at the distal end of a floor 62 of the distal end part of the cab 6, such that the distance sensors 22 and 23 are arranged in the left-right direction. In this example, the measuring direction of each of the distance sensors 22 and 23 is fixed. Alternatively, each of the distance sensors 22 and 23 may be configured such that the measuring direction thereof is controllable or changeable.

As shown in FIG. 3, a bellows portion 63 capable of expanding and contracting in the front-back direction is provided on the distal end part of the cab 6. FIG. 3 shows a gate-shaped contacting portion provided on the front end of the bellows portion 63. The gate-shaped contacting portion comes into contact with the aircraft 3.

As shown in FIG. 4, the passenger boarding bridge 1 is further provided with: a rotunda angle sensor 24, which detects a rotational angle $\theta_R$ (FIG. 1) of the rotunda 4; a cab angle sensor 25, which detects a rotational angle $\Phi_C$ (FIG. 1) of the cab 6 relative to the tunnel unit 5; a travel unit angle sensor 26, which detects a rotational angle $\Phi_W$ (FIG. 1) of the travel unit 12 relative to the tunnel unit 5; an inclination angle measurer 27; and a horizontal distance measurer 28. These sensors and measurers are arranged at suitable positions, respectively. The inclination angle measurer 27 and the horizontal distance measurer 28 are configured as, for example, a distance meter that measures the amount of lifting/lowering (the amount of upward/downward movement) of the tunnel unit 5 by the lifting/lowering mechanism 10 and a distance meter that measures the length of the tunnel unit 5, respectively. However, the configurations of the inclination angle measurer 27 and the horizontal distance measurer 28 are not thus limited. Alternatively, the inclination angle measurer 27 and the horizontal distance measurer 28 may be configured as, for example, a sensor that directly measures an inclination angle and a sensor that directly measures a horizontal distance, respectively.

The inclination angle measurer 27 measures an inclination angle $\beta$ (see FIG. 2) of the tunnel unit 5 relative to a horizontal plane. When the tunnel unit 5 is in a horizontal state, the inclination angle measurer 27 measures the inclination angle $\beta$ as 0. When the position of the distal end of the tunnel unit 5 and the position of the cab 6 are lower than these positions in the horizontal state, the inclination angle measurer 27 calculates the inclination angle $\beta$ as a negative value. When the position of the distal end of the tunnel unit 5 and the position of the cab 6 are higher than these positions in the horizontal state, the inclination angle measurer 27 calculates the inclination angle $\beta$ as a positive value. Accordingly, in a case where the tunnel unit 5 is in an inclined state shown in FIG. 2, the inclination angle $\beta$ is a negative value ($\beta<0$).

The horizontal distance measurer 28 can measure a rotunda-to-travel unit horizontal distance LW, which is a horizontal distance from the center point of the rotunda 4 (the center point is located on the rotational axis CL1) to the center point of the travel unit 12 (the center point of the pair of drive wheels 9; the center point is located on the rotational axis CL3). The rotunda-to-travel unit horizontal distance LW is a distance (horizontal distance) from the rotational axis CL1 to the center point of the travel unit 12.

FIG. 1 shows the tunnel unit 5 being in a horizontal state (i.e., a state in which the inclination angle $\beta$ of FIG. 2 is 0) and the cab 6 being in a state in which the distal end part of the cab 6 faces the aircraft 3. On the other hand, FIG. 2 shows the tunnel unit 5 being inclined by the inclination angle $\beta$ and the cab 6 being in a state in which the distal end part of the cab 6 faces in the same direction as the extending direction of the tunnel unit 5.

An operation panel 31 as shown in FIG. 4 is provided inside the cab 6. The operation panel 31 is provided with various operation switches 33 for performing, for example, operations of lifting/lowering the tunnel unit 5 and the cab 6 by the lifting/lowering mechanism 10 and rotating the cab 6. The operation panel 31 is further provided with: an operating lever 32 for operating the drive wheels 9; and a display device 34. The operating lever 32 is configured as a lever-shaped input device (i.e., a joystick) that has degrees of freedom multi-directionally.

A control device 50 and the operation panel 31 are connected to each other via electrical circuitry. The control device 50 is configured to: receive inputs of, for example, information (operation information) that is based on operations performed on the operation switches 33 and the operating lever 32, image data captured by the camera 21, output signals from the sensors 22 to 26, and measurement values from the measurers 27 and 28; control the operations of the passenger boarding bridge 1; and output, for example, information to be displayed on the display device 34.

It should be noted that the control device 50 includes an arithmetic processing unit such as a CPU and a storage unit including a ROM, RAM, etc. A control program for operating the passenger boarding bridge 1 and information necessary for the operations of the passenger boarding bridge 1 are prestored in the storage unit. By executing the control program, the arithmetic processing unit functions as a controller that, for example, controls the operations of the components of the passenger boarding bridge 1 (the operations of, for example, the two drive wheels 9 of the travel unit 12, the lifting/lowering mechanism 10, and the rotational mechanism of the cab 6), and also functions as, for example, a door position calculator (entrance position calculator) 51. It should be noted that information to be stored while the passenger boarding bridge 1 is in operation is also stored in the storage unit. For example, the cab 6 or the frontmost tunnel 5b is provided with the control device 50.

Figure 5:
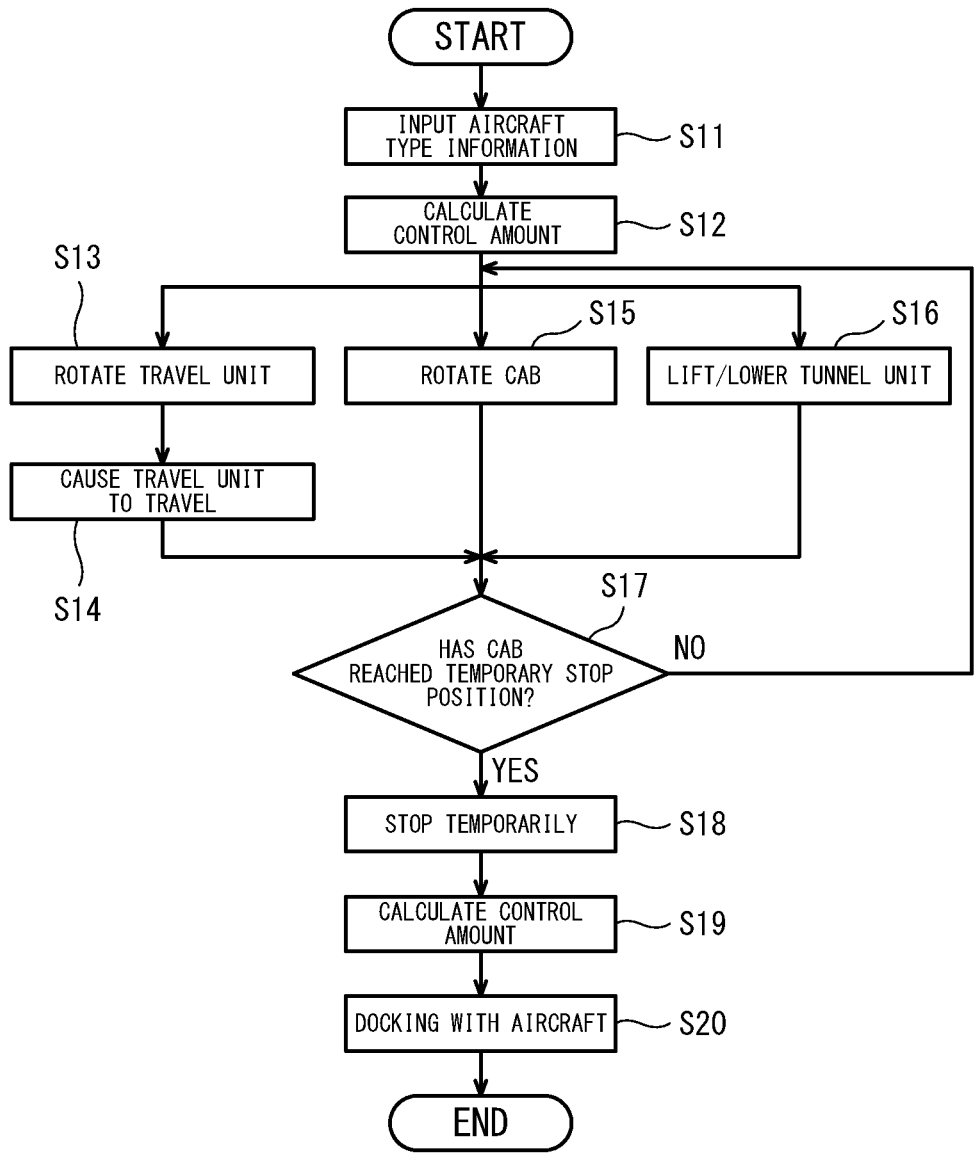
FIG. 5 is a flowchart showing one example of operations of the passenger boarding bridge at the time of docking.

Next, one example of operations of the passenger boarding bridge 1 is described. Operations of the passenger boarding bridge 1 are realized by control performed by the control device 50. FIG. 5 is a flowchart showing one example of operations performed when docking the cab 6 of the passenger boarding bridge 1 with the aircraft 3.

When controlling the passenger boarding bridge 1, the control device 50 uses an XYZ orthogonal coordinate system as shown in FIG. 1. Specifically, as absolute coordinates, the intersection point of the rotational axis CL1 of the rotunda 4 and a plane EP (see FIG. 2) of the apron is taken as the origin (0, 0, 0), and the X-axis, the Y-axis, and the Z-axis (which extends vertically) are set with respect to the origin. Each part of the passenger boarding bridge 1 is represented by position coordinates in the coordinate system.

After the aircraft 3 has arrived at the apron (a predetermined aircraft parking area) and before the aircraft 3 stops, the passenger boarding bridge 1 stands by at a standby position that is indicated by solid line in FIG. 1. When the passenger boarding bridge 1 is at the standby position, there may be a case where the entrance (the door 3a) of the aircraft 3 is not within the field of view of the camera 21 or is not within the range of detection by the two distance sensors 22 and 23. In such a case, after the aircraft 3 has stopped, the passenger boarding bridge 1 is separately operated to rotate the cab 6 and/or to drive the travel unit 12 to such a position that the entrance (the door 3a) of the aircraft 3 is within the field of view of the camera 21 and within the range of detection by the two distance sensors 22 and 23. Then, the position is set as a movement start position. The description hereinafter, for the purpose of simplifying the description, describes a case where when the passenger boarding bridge 1 is at the standby position, the entrance (the door 3a) of the aircraft 3 is within the field of view of the camera 21 and within the range of detection by the two distance sensors 22 and 23 (i.e., a case where the standby position is the movement start position).

It should be noted that in a case where the image-capturing direction and the angle of view of the camera 21 are adjustable, the image-capturing direction and the angle of view may be adjusted such that the entrance (the door 3a) of the aircraft 3 is within the field of view of the camera 21.

In a case where the measuring direction of each of the distance sensors 22 and 23 is adjustable, the measuring direction of each distance sensor may be adjusted so as to detect the aircraft 3.

The standby position of the passenger boarding bridge 1 is the movement start position, from which the passenger boarding bridge 1 starts moving at the time of performing docking with the entrance (the door 3a) of the aircraft 3. At the time of docking the passenger boarding bridge 1 with the entrance of the aircraft 3, the passenger boarding bridge 1 starts moving from the standby position, and then the cab 6 is docked with the entrance. When the cab 6 is undocked from the entrance, the passenger boarding bridge 1 returns to and stops at the standby position, and then the passenger boarding bridge 1 stands by at the standby position until the operation of docking the cab 6 with the entrance of the next aircraft starts.

It should be noted that when the cab 6 is undocked from the aircraft 3 and returns to the standby position, the coordinates of a center position P3 of the travel unit 12 when the travel unit 12 is at the target standby position (i.e., the position coordinates of the standby position of the travel unit 12) is prestored in the control device 50. Also, as shown in FIG. 2, the control device 50 prestores therein the following values: a distance LB (a predetermined value) from a center position P1 to a distal end position P2 of the cab 6; a distance LD (a predetermined value) from the center position P1 of the cab 6 to a mounting position of the drive columns 8; a distance LR (a predetermined value) from the center point of the rotunda 4 to a connection point (located on the horizontal rotational axis CL4) where the rotunda 4 is connected to the tunnel unit 5; a height HR (a predetermined value) of the connection point; and a radius HW (a predetermined value) of the drive wheels 9.

For example, the center position (P1) of the cab 6 is represented by the position coordinates of the center point of the cab 6 (a predetermined point on the rotational axis CL2). The coordinates of the center position P1 of the cab 6 at the standby position can be calculated by using, for example, the inclination angle β of the tunnel unit 5, the rotunda-to-travel unit horizontal distance LW, the rotational angle $\theta_R$ of the rotunda 4, the distance LR from the center point of the rotunda 4 to the connection point where the rotunda 4 is connected to the tunnel unit 5, and the distance LD from the center position P1 of the cab 6 to the mounting position of the drive columns 8. The coordinates of the distal end position P2 of the cab 6 can be calculated by using the center position P1 of the cab 6, the distance LB from the center position P1 to the distal end position P2 of the cab 6, the rotational angle $\Phi_C$ of the cab 6, the rotational angle $\theta_R$ of the rotunda 4, and the inclination angle β of the tunnel unit 5. The X and Y coordinates of the center position P3 of the travel unit 12 can be calculated by using the rotunda-to-travel unit horizontal distance LW and the rotational angle $\theta_R$ of the rotunda 4. The Z coordinate of the center position P3 of the travel unit 12 is a constant value that is the value of the radius HW (see FIG. 2) of the drive wheels 9.

The passenger boarding bridge 1 drawn with two-dot chain lines in FIG. 1 is at a docking position where the cab 6 is in the state of being docked with the entrance of the aircraft 3. In this state, a distal end position (P5) of the cab 6 is in contact with the entrance of the aircraft 3.

A regular stop position is set for the aircraft 3. When the aircraft 3 is at the regular stop position, the axis of the aircraft 3 is on an aircraft axis line (fuselage guide line) AL. The regular stop position is a predetermined position set relative to the Y-axis direction. Although the aircraft 3 is brought to a stop targeting the regular stop position, there are cases where an actual stop position of the aircraft 3 deviates from the regular stop position. It should be noted that the aircraft axis line AL is drawn on the apron. FIG. 1 shows the axis of the aircraft 3 being on the aircraft axis line AL.

Operations of the passenger boarding bridge 1 until it is docked with the aircraft 3 are automatically performed based on the control performed by the control device 50. This automatic control is performed as described below. It should be noted that, in the description below, the X coordinate, the Y coordinate, and the Z coordinate of a position Pn (n is an integer) are referred to as Xn, Yn, and Zn, respectively. An X coordinate value, a Y coordinate value, and a Z coordinate value each indicate a distance from the origin (0, 0, 0), which is the position of the rotational axis CL1 of the rotunda 4 (e.g., in units of [mm]). In this example, in FIG. 1, X coordinate values on the right side of the origin (0, 0, 0) are positive X coordinate values, and X coordinate values on the left side of the origin (0, 0, 0) are negative X coordinate values. Y coordinate values on the opposite side of the origin (0, 0, 0) from the terminal building 2 are positive Y coordinate values. Z coordinate values upward of the origin (0, 0, 0) are positive Z coordinate values.

As shown in FIG. 5, in step S11, an operator pushes an aircraft type selection button (not shown) on the operation panel 31 to select the aircraft type of the aircraft 3. The selected aircraft type information is inputted to the control device 50.

Next, the operator pushes a start button (one of the operation switches 33) on the operation panel 31, and thereby automatic control described below is started. In the present embodiment, for the purpose of improving the safety, the start button is in an ON state only while the operator is pushing the button, i.e., configured as a dead man's switch. Accordingly, when the operator releases their hand from the button, the automatic control is stopped forcibly.

Figure 6:
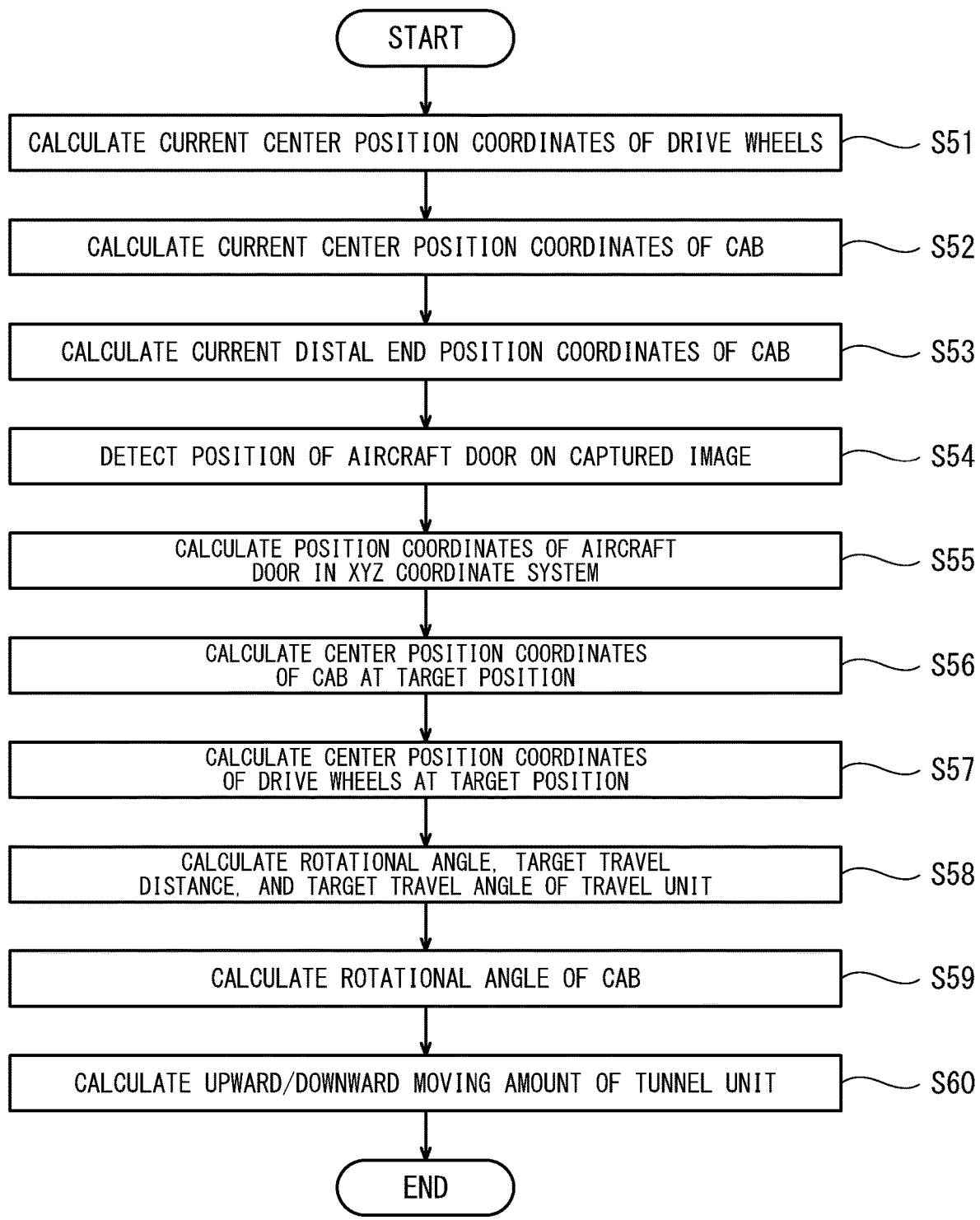
FIG. 6 is a flowchart showing one example of a method of calculating control amounts for operations of the passenger boarding bridge at the time of docking.

When the above start button is pressed, the control device 50 calculates, in step S12, control amounts for moving the passenger boarding bridge 1 to a target position. A specific example case is described below in (1) to (3). FIG. 6 shows one example of a flowchart in this case. The order of the steps shown in FIG. 6 is not limited to the order indicated in FIG. 6. In this example case, the target position is the docking position represented by two-dot chain lines in FIG. 1.

(1) Calculation of Rotational Angle, Target Travel Distance, and Target Travel Angle of Travel Unit 12 (Steps S51 to S58 in FIG. 6)

Calculated in these steps are a rotational angle, a target travel distance, and a target travel angle of the travel unit 12 (drive wheels 9) for moving the center position of the cab 6 at the standby position from the current center position P1 (X1, Y1, Z1) to a target center position P6 (X6, Y6, Z6), at which the cab 6 is docked with the door 3a of the aircraft 3.

In step S51, the control device 50 calculates the XY coordinates (X3, Y3) of the current center position P3 of the drive wheels 9 (the current center position of the travel unit 12) at the standby position by using formulas shown below.

$$X3 = LW \times \cos \theta_R$$

$$Y3 = LW \times \sin \theta_R$$

In these formulas, the rotunda-to-travel unit horizontal distance LW is a value based on the horizontal distance measurer 28 when the travel unit 12 is at the standby position, and the rotational angle $\theta_R$ of the travel unit 12 is a value based on the rotunda angle sensor 24 when the travel unit 12 is at the standby position. It should be noted that the Z coordinate of the center position of the drive wheels 9 is always a predetermined fixed value that is the value of the radius HW of the drive wheels 9.

Next, the control device 50 performs steps S52 to S55 to calculate a position P4 (X4, Y4, Z4) of the door 3*a* of the aircraft 3. It should be noted that (X4, Y4, Z4) is positional information of the entrance (the door 3*a*).

First, in step S52, the control device 50 calculates the current center position P1 (X1, Y1, Z1) of the cab 6 by using formulas shown below.

$$X1 = LC \times \cos\theta_R$$

$$Y1 = LC \times \sin\theta_R$$

$$Z1 = (LC - LR) \times \tan\beta + HR$$

In these formulas, as shown in FIG. 2, LC is a rotunda-to-cab horizontal distance, specifically a horizontal distance from the center point of the rotunda 4 to the center point of the cab 6. The rotunda-to-cab horizontal distance LC is calculated by using the following values: the inclination angle β of the tunnel unit 5, which is a measurement value of the inclination angle measurer 27 when the cab 6 is at the standby position; a distance LE; the distance LD (predetermined value); and the distance LR (predetermined value). The rotunda-to-cab horizontal distance LC is calculated by using a formula shown below.

$$LC = LR + LF \times \cos\beta = LR + (LE + LD) \times \cos\beta$$

It should be noted that, as shown in FIG. 2, LF is the distance from the proximal end part of the tunnel unit 5 (the position of the horizontal rotational axis CL4) to the center position P1 of the cab 6, and LF=LE+LD. The distance LE is the distance from the proximal end part of the tunnel unit 5 (the position of the horizontal rotational axis CL4 shown in FIG. 2) to the mounting position of the drive columns 8. The distance LE can be calculated from a measurement value of the distance meter that measures the length of the tunnel unit 5, the distance meter being included in the horizontal distance measurer 28.

Next, in step S53, the control device 50 calculates the current distal end position P2 (X2, Y2, Z2) of the cab 6 by using formulas shown below. It should be noted that the rotational angle $\Phi_C$ is a value based on the cab angle sensor 25 when the cab 6 is at the standby position.

$$X2 = X1 + LB \times (\cos\Phi_C \cos\beta \cos\theta_R - \sin\Phi_C \sin\theta_R)$$

$$Y2 = Y1 + LB \times (\cos\Phi_C \cos\beta \sin\theta_R + \sin\Phi_C \cos\theta_R)$$

$$Z2 = Z1 + LB \times (\cos\Phi_C \sin\beta)$$

Next, in steps S54 and S55, the control device 50 detects the door 3*a* of the aircraft 3 based on an image captured by the door image capturing camera 21, and calculates the position P4 (X4, Y4, Z4) of the door 3*a*.

Figure 7:
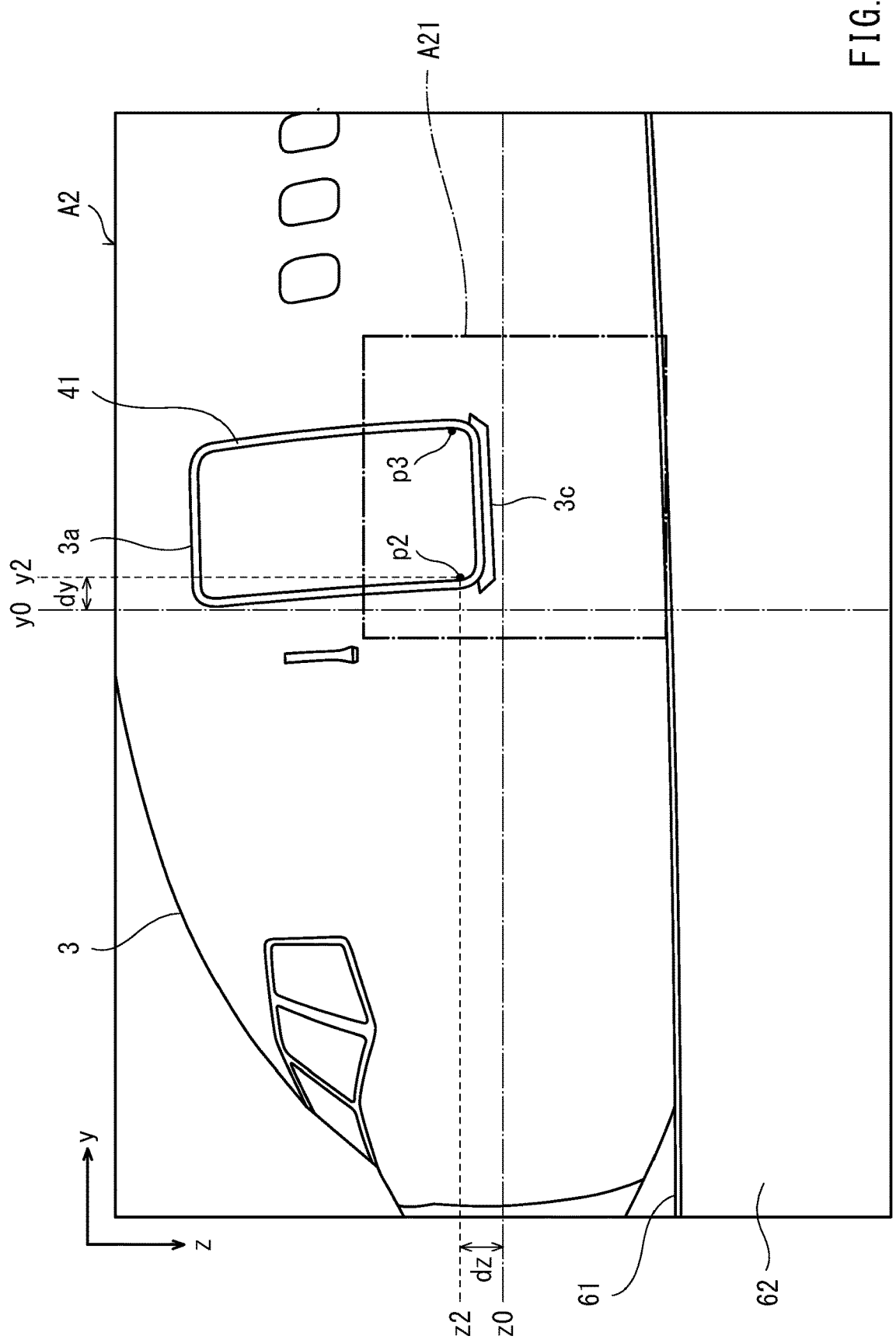
FIG. 7 is a schematic diagram showing one example of an image captured by a door image capturing camera when the cab is at a standby position.
Figure 8:
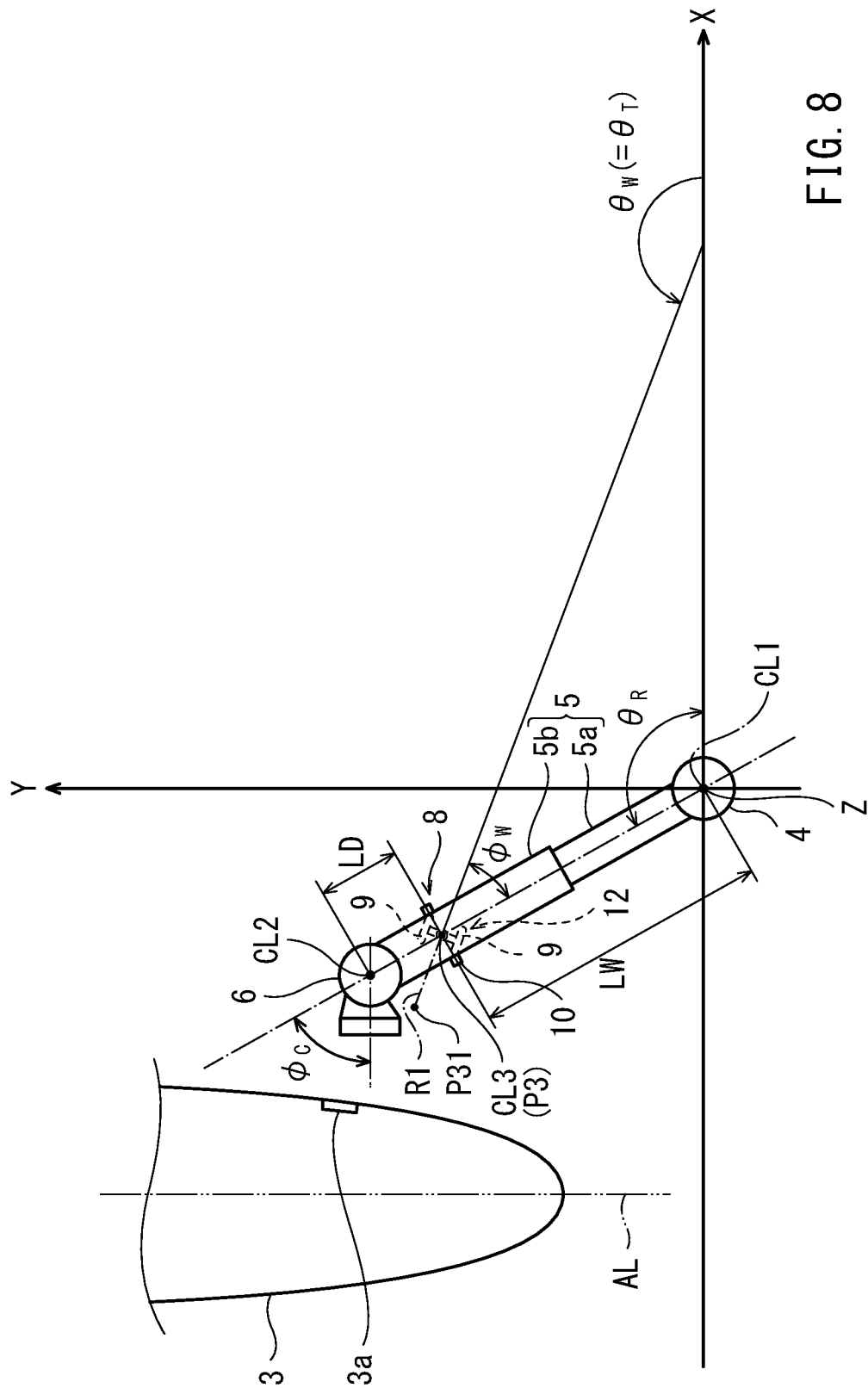
FIG. 8 is a schematic plan view of a conventional passenger boarding bridge.

A detailed description is given in this respect. FIG. 7 is a schematic diagram showing one example of an image A2 captured by the door image capturing camera 21 when the cab 6 is at the standby position.

The position P4 of the door 3*a* of the aircraft 3 can be defined in various ways. It is assumed herein that the position P4 is detected by image recognition technology, and the position P4 is defined as the position of a reference point p2, which is a boundary point between a curved portion of the lower left corner of a painted portion 41 of the door 3*a* and a straight portion extending upward from the corner.

In general, the contour portion of the door 3*a* of the aircraft 3 is painted so that the door 3*a* can be visually recognized. In this example, the door 3*a* and the reference point p2 thereof are detected based on the shape of the painted portion 41.

In step S54, the control device 50 detects the door 3*a*, and also detects the position of the reference point p2 as the position of the door 3*a*, as described above, and determines the position of the left-side reference point p2 in this example in the form of yz coordinates (y2, z2). It should be noted that the control device 50 defines a yz orthogonal coordinate system by setting a predetermined position (e.g., the upper left corner) of the captured image A2 as an origin (0, 0). The y coordinate value and the z coordinate value of any point on the captured image A2 are represented by pixel values counted from the origin (0, 0). In the captured image A2, the coordinates of the optical axis of the camera 21 are (y0, z0).

In step S55, the control device 50 first calculates relative positional information (dX, dY, dZ) based on a predetermined calculation formula (A), the relative positional information (dX, dY, dZ) indicating the position of the entrance (the door 3*a*) as seen from the cab 6. The calculation formula (A) is a formula with which to calculate the relative positional information (dX, dY, dZ) by using following values as parameters: measurement values of the distance sensors 22 and 23; displacements (dy, dz) of the reference point p2; the rotational angle $\theta_R$ of the rotunda 4; the rotational angle $\Phi_C$ of the cab 6; and the inclination angle β of the tunnel unit 5. When performing the calculation, data that corresponds to the aircraft type information obtained in step S11, the data being specific to the fuselage (and prestored in the storage unit of the control device 50), may be referred to. The displacement dy of the reference point p2 is a difference between the y coordinate value y2 of the reference point p2 and the y coordinate value y0 of the optical axis of the camera 21 (dy=y2−y0). The displacement dz of the reference point p2 is a difference between the z coordinate value z2 of the reference point p2 and the z coordinate value z0 of the optical axis of the camera 21 (dz=z2−z0).

Further, in step S55, the control device 50 calculates the position P4 (X4, Y4, Z4) of the door 3*a* of the aircraft 3 in the XYZ orthogonal coordinate system by using the above relative positional information (dX, dY, dZ) with formulas shown below.

$$X4 = X2 + dX$$

$$Y4 = Y2 + dY$$

$$Z4 = Z2 + dZ$$

Next, in step S56, based on the position P4 (X4, Y4, Z4) of the door 3*a* of the aircraft 3 and displacements (dX5, dY5, dZ5) calculated from, for example, measurement values of the distance sensors 22 and 23 and a docking position offset distance, the control device 50 calculates the target center position P6 (X6, Y6, Z6) of the cab 6 as shown below.

$$X6 = X4 + dX5$$

$$Y6 = Y4 + dY5$$

$$Z6 = Z4 + dZ5$$

It should be noted that, to obtain the docking position offset distance, the data corresponding to the aircraft type information obtained in step S11, the data being specific to the fuselage (and prestored in the storage unit of the control device 50) may be referred to.

Next, in step S57, a rotunda-to-travel unit horizontal distance LW1, an inclination angle β1 of the tunnel unit 5, and a rotational angle $\theta_R 1$ of the rotunda 4 when the center position of the cab 6 is P6 (X6, Y6, Z6) are calculated by the control device 50 based on a predetermined arithmetic formula (B). Then, the XY coordinates (X7, Y7) of a center position P7 of the drive wheels 9 when the drive wheels 9 are at the target position are calculated by using formulas shown below.

$$X7 = LW1 \times \cos \theta_R 1$$

$$Y7 = LW1 \times \sin \theta_R 1$$

It should be noted that, as mentioned above, the Z coordinate (Z7) of the center position (P7) of the drive wheels 9 is a predetermined fixed value.

Next, in step S58, the control device 50 calculates a rotational angle $\Phi_W 1$, a target travel distance, and a target travel angle $\theta_T$ of the travel unit 12. In this step, first, the control device 50 calculates a moving distance RD of the travel unit 12 in a case where the travel unit 12 travels straight from the current position (P3) to the target position (P7) and a rotational angle $\Phi_W 1$ of the travel unit 12 at the current position relative to the tunnel unit 5 in the case where the travel unit 12 travels straight from the current position (P3) to the target position (P7). The control device 50 calculates the moving distance RD and the rotational angle $\Phi_W 1$ by using formulas shown below. Here, the movable range of the passenger boarding bridge 1 is a range in which the Y coordinate is non-negative, i.e., $0° \leq \theta_R \leq 180°$.

$$RD = \{(X7-X3)^2 + (Y7-Y3)^2\}^{1/2}$$

$$\Phi_W 1 = \arccos\{(X7-X3)/RD\} - \theta_R$$

In this manner, the moving distance RD and the rotational angle $\Phi_W 1$ of the travel unit 12 can be calculated. If the rotational angle of the travel unit 12 at the current position is $\Phi_W$, then in the following step S13, the two drive wheels 9 are rotated in opposite directions to each other to correct the facing direction of the travel unit 12, thereby eliminating the difference between $\Phi_W 1$ and $\Phi_W$.

Further, in the case of a predetermined state in which the moving distance RD is less than the rotunda-to-travel unit horizontal distance LW when the travel unit 12 is at the standby position, the control device 50 sets the target position (P7) as the destination, and sets the moving distance RD as the target travel distance. In the predetermined state, for example, the moving distance RD is less than or equal to a predetermined distance (LT), which is less than the rotunda-to-travel unit horizontal distance LW (RD≤LT). The predetermined distance (LT) is prestored in the control device 50. Then, a path corresponding to the target travel distance (RD), i.e., a straight path from the center position P3 of the drive wheels 9 at the standby position to the center position P7 of the drive wheels 9 at the target position, is set as a target travel path R1 when the travel unit 12 travels in the following step S14.

Further, the control device 50 calculates the target travel angle $\theta_T$, which indicates the target travel direction of the travel unit 12, as $\theta_T = \theta_R + \Phi_W 1$. Specifically, the target travel angle $\theta_T$ is an angle formed by the target travel direction (the direction in which the target travel path R1 extends) and a particular direction (e.g., the X-axis positive direction), and is an absolute angle on the plane of the apron.

In a case where the moving distance RD is not in the predetermined state, i.e., not less than the rotunda-to-travel unit horizontal distance LW when the travel unit 12 is at the standby position (e.g., RD>LT), the travel unit 12 temporarily moves to a point that is closer to the target position such that the moving distance RD becomes the predetermined state. Then, with the point set as a new movement start position, the processing from step S12 (control amount calculation) is repeated again to reach the target position (P7), which is the docking position. It should be noted that FIG. 5 shows the steps that are performed in the case of the predetermined state (e.g., RD≤LT).

(2) Calculation of Rotational Angle of Cab 6 (step S59 in FIG. 6)

Next, in step S59, the control device 50 calculates a rotational angle $\Phi_C 1$ of the cab 6, the rotational angle $\Phi_C 1$ determining the orientation (i.e., facing direction) of the cab 6 when the cab 6 is at the target position (P6). In a case where an angle formed by the surface of the door 3a of the aircraft 3 and the X-axis positive direction, the angle being calculated from, for example, measurement values of the distance sensors 22 and 23, is a, the rotational angle $\Phi_C 1$ is calculated as $\Phi_C 1 = \alpha + 90 - \theta_R 1$, where $$\theta_R 1 = \arccos(X6/LC1)$$

$$0° \leq \theta_R 1 \leq 180°$$

$$LC1 = \{(X6)^2 + (Y6)^2\}^{1/2}$$

If the rotational angle of the cab 6 at the current position is $\Phi_C$, then in the following step S15, the cab 6 is rotated by a difference between $\Phi_C 1$ and $\Phi_C$. In this case, in step S15, the orientation (i.e., facing direction) of the cab 6 is rotated at the target position in accordance with the angle (α) of the door 3a of the aircraft 3.

(3) Calculation of Upward/Downward Moving Amount of Tunnel Unit 5 (step S60 in FIG. 6)

Next, in step S60, the control device 50 calculates an upward/downward moving amount by which the tunnel unit 5 is moved upward/downward by the lifting/lowering mechanism 10 when the cab 6 moves from the current position to the target position, i.e., calculates an upward/downward moving amount of the cab 6 for adjusting the height of the cab 6 to the height of the door 3a. By using the rotunda-to-travel unit horizontal distance LW1 and the inclination angle θ1 of the tunnel unit 5, which are obtained in the above step S57, the control device 50 calculates an upward/downward moving amount dH, by which the tunnel unit 5 in a horizontal state is moved upward/downward by the lifting/lowering mechanism 10, with a formula shown below.

$$dH = (LW1 - LR) \times \tan \beta 1 / \cos \beta 1 + (1/\cos \beta 1 - 1) \times (HR - HW)$$

In the formula, LR is the distance from the center point of the rotunda 4 to the connection point where the rotunda 4 is connected to the tunnel unit 5; HR is the height of the connection point where the rotunda 4 is connected to the tunnel unit 5 (the height of the proximal end part of the tunnel unit 5); and HW is the radius of the drive wheels 9 of the travel unit 12 (see FIG. 2).

After calculating the control amounts as described above, the control device 50 performs steps S13 to S16.

In step S15, the control device 50 rotates the cab 6, such that the rotational angle of the cab 6 becomes "$\Phi_C 1$". In step S16, the control device 50 operates the lifting/lowering mechanism 10, such that the upward/downward moving amount of the tunnel unit 5 from the horizontal state becomes "dH" calculated in step S60.

In step S13, in order to adjust the travel direction of the travel unit 12 to the target travel direction indicated by the target travel angle $\theta_T$, the control device 50 rotates the two drive wheels 9 in opposite directions to each other, such that the rotational angle of the travel unit 12 becomes "$\Phi_W 1$", thereby correcting the facing direction of the drive wheels 9, and then in the following step S14, causes the travel unit 12 to start traveling straight by the two drive wheels 9.

In step S14, during the traveling, the control device 50 always calculates, at predetermined time intervals, a travel angle ($\theta_W$) indicating the travel direction of the travel unit 12, and controls the rotation speed of each of the drive wheels 9, such that the travel angle ($\theta_W$) is kept to the target travel angle $\theta_T$. Here, in a case where the rotational angle of the rotunda 4 detected by the rotunda angle sensor 24 is $\theta_{Rt}$, and the rotational angle of the travel unit 12 detected by the travel unit angle sensor 26 is (wt at a certain time point t during the traveling, a travel angle $\theta_{Wt}$ of the travel unit 12 at the time point t is calculated as $\theta_{Wt}=\theta_{Rt}+\Phi_{Wt}$, where the travel angle $\theta_{Wt}$ is an angle formed by the travel direction of the travel unit 12 and a particular direction (e.g., the X-axis positive direction), and is an absolute angle on the plane of the apron. The travel control in this step is the same as travel control that is performed when the travel unit 12 travels in step S20 described below.

Next, in step S17, the control device 50 determines whether or not the cab 6 has reached a predetermined temporary stop position (which is, in this example, a position that is spaced apart forward from the door 3a by 0.1 m). If it is determined that the cab 6 has reached the temporary stop position, the control device 50 temporarily stops the traveling by the two drive wheels 9 (step S18). In this case, after starting the traveling by the two drive wheels 9 in step S14, the control device 50 measures the distance between the aircraft 3 and the distal end of the cab 6 based on measurement values of the two distance sensors 22 and 23, and reduces the travel speed in accordance with the measured distance. When the measured distance has become 0.1 m, the control device 50 determines that the cab 6 has reached the temporary stop position, and stops the traveling by the drive wheels 9. Between the measurement values of the respective two distance sensors 22 and 23, for example, the measurement value indicating a shorter distance is adopted as the measured distance.

Next, in step S19, the control device 50 calculates control amounts for performing fine adjustment of, for example, the vertical position of the cab 6. In this step, for example, similar to step S60, an upward/downward moving amount "dH2" of the tunnel unit 5 from the horizontal state is calculated based on an image captured by the door image capturing camera 21.

Next, in step S20, the control device 50 performs the fine adjustment of the vertical position of the cab 6, and also resumes the traveling by the drive wheels 9 at a slow speed. When either one of the measurement values of the respective two distance sensors 22 and 23 has become 0, the control device 50 stops the traveling. Subsequently, the control device 50 operates the bellows portion 63, such that the bellows portion 63 expands forward to come into contact with the aircraft 3, thereby docking the cab 6 with the aircraft 3.

It should be noted that in order to bring the passenger boarding bridge 1 back to the standby position, for example, the operator may push a return button of the operation panel 31 (one of the operation switches 33), the return button being configured as a dead man's switch. In this manner, the control device 50 can be caused to start performing automatic control for bringing the passenger boarding bridge 1 back to the predetermined standby position.

It should be noted that, in the above description, in step S12, the rotational angle of the cab 6 is calculated as described in step S59. However, as an alternative, without calculating the rotational angle of the cab 6, the control device 50 may rotate the cab 6 in step S15, such that the measurement values of the respective two distance sensors 22 and 23 are equalized.

The aircraft 3 is provided with a reinforcing plate 3c immediately below the door 3a. Accordingly, at the time of detecting the door 3a of the aircraft 3 based on the image captured by the door image capturing camera 21, the door 3a may be detected based on the shape of the corners of the door 3a and the shape of the reinforcing plate 3c.

In the above description, the distance between the cab 6 and the aircraft 3 is detected by the distance sensors 22 and 23 at, for example, the standby position and the temporary stop position. However, as an alternative, the distance (actual distance) between the cab 6 and the aircraft 3 may be calculated by using the yz coordinates of each of two reference points (p2, p3) of the door 3a on the image captured by the door image capturing camera 21.

In the above description, the distance between the cab 6 and the aircraft 3 is detected by the distance sensors 22 and 23 at, for example, the standby position and the temporary stop position. However, as an alternative, the distance (actual distance) between the cab 6 and the aircraft 3 may be calculated by, for example, triangulation by using the yz coordinates of each of reference points (p2-A, p2-B, . . . ) of the door 3a on each of images captured by two or more door image capturing cameras 21.

In the above description, while moving from the standby position to the docking position, the passenger boarding bridge 1 temporarily stops at the predetermined temporary stop position. However, as an alternative, the passenger boarding bridge 1 may continuously move from the standby position to the docking position without making the temporary stop. In such a case where no temporary stop position is set, the control amount calculation (in step S19) may be performed when the passenger boarding bridge 1 traveling at a low speed has become close to the docking position.

In the travel control method of the present embodiment, at the movement start position (e.g., standby position), in a case where the target travel distance of the travel unit 12 is less than the rotunda-to-travel unit horizontal distance LW, during the traveling of the travel unit 12 by the drive wheels 9 in steps S14 and S20, the control device 50 always calculates the travel angle $\theta_{Wt}$ by adding up a measurement value of the rotunda angle sensor 24 and a measurement value of the travel unit angle sensor 26, and performs feedback control of controlling the rotation speed of each of the two drive wheels 9 (i.e., controlling the travel speed) such that the travel angle $\theta_{Wt}$ is kept to the target travel angle $\theta_T$. At the time of performing the feedback control, the positional discrepancy between the current position of the travel unit, the calculation of which is significantly affected by a measurement error of the rotunda angle sensor 24, and the scheduled current position of the travel unit on the target travel path R1 is not taken into account, but only the travel angle is taken into account as described above, which makes it possible to cause the travel unit 12 to travel straight properly from the movement start position to the target position (destination position).

On the other hand, according to the conventional travel control method, in a case where the travel unit 12 travels straight on the linear target travel path R1, during the traveling, the rotation speed of each of the two drive wheels 9 is adjusted, such that the discrepancy (direction angle discrepancy) between the actual travel angle $\theta_{Wt}$ and the target travel angle $\theta_T$ is reduced, and such that the discrepancy (positional discrepancy) between the current position of the travel unit 12, which is calculated based on the rotational angle of the rotunda and the rotunda-to-travel unit horizontal distance, and the scheduled current position of the travel unit 12 on the target travel path R1 is reduced.

Figure 9A:
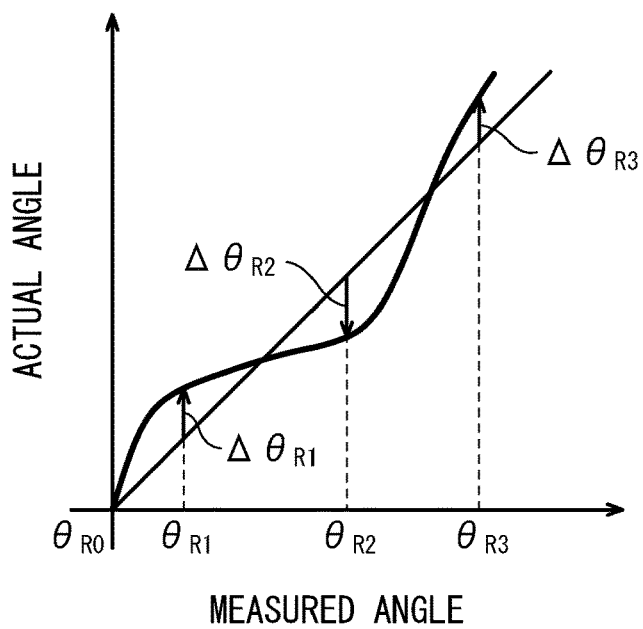
FIG. 9A shows one example of a relationship between an angle measured by a rotunda angle sensor and an actual angle.
Figure 9B:
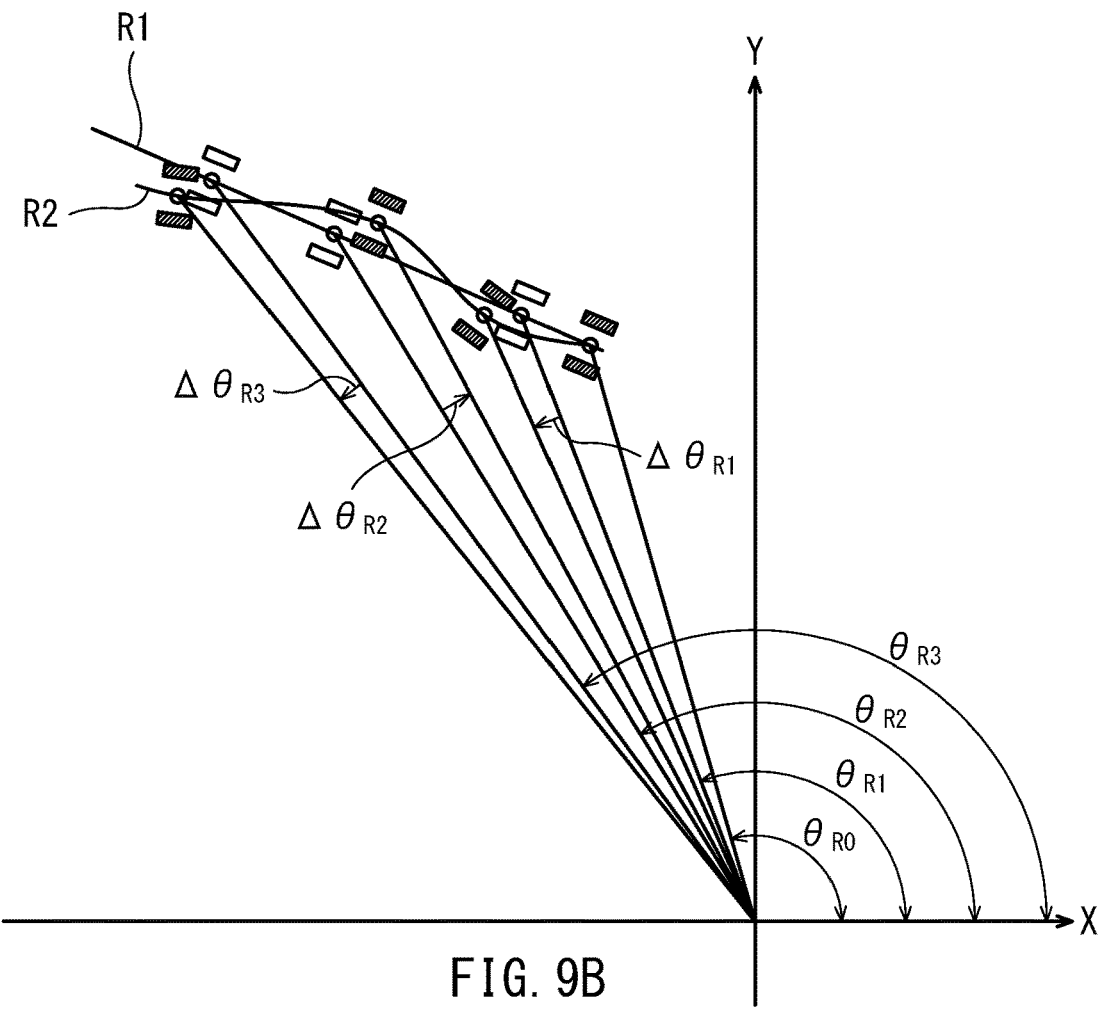
FIG. 9B shows one example of an actual travel path of drive wheels when there are measurement errors between the measured angle and the actual angle as shown in FIG. 9A.

When the rotunda angle sensor 24 measures the rotational angle of the rotunda 4, a measurement error occurs (see FIG. 9A). The current position of the travel unit 12 is calculated based on the measurement value of the rotunda angle sensor 24 (i.e., the measured rotational angle of the rotunda 4) and the rotunda-to-travel unit horizontal distance. Accordingly, the amount of positional deviation of the travel unit 12 from the target travel path R1 is substantially proportional to the product of the rotunda-to-travel unit horizontal distance and the measurement error of the rotational angle of the rotunda 4. Thus, the measurement error of the rotational angle of the rotunda 4 is amplified by the rotunda-to-travel unit horizontal distance, and the amount of positional deviation of the travel unit 12 from the target travel path R1 increases in accordance with increase in the rotunda-to-travel unit horizontal distance.

In view of the above, in the present embodiment, a distance less than the rotunda-to-travel unit horizontal distance LW is set as a target travel distance, and during the traveling, the control is performed such that only the direction angle discrepancy is reduced, and thereby the amount of positional deviation from the target travel path R1 is reduced, which makes it possible to cause the travel unit 12 to travel straight properly. If the control is performed in a manner to also reduce the positional discrepancy as in the conventional art, proper straight traveling cannot be performed since a large amount of positional deviation substantially proportional to the rotunda-to-travel unit horizontal distance LW, which is longer than the target travel distance, occurs.

It should be noted that the target travel distance is required to be less than the rotunda-to-travel unit horizontal distance LW at the movement start position. For example, more preferably, the target travel distance is not greater than LW/5. The target travel distance (RD) may be less than or equal to the predetermined distance (LT), which is less than the rotunda-to-travel unit horizontal distance LW at the movement start position. The predetermined distance (LT) may be, for example, a distance that is less than the horizontal distance from the rotational axis (vertical axis) CL1 of the rotunda 4 to the center point of the travel unit 12 in a case where the tunnel unit 5 is fully retracted. More specifically, for example, the present invention is applied to a case where LT=3 m and the travel distance is within the range of less than or equal to 3 m. In this case, proper straight traveling can be achieved. In this case, automatic docking of the cab 6 with an aircraft entrance can be readily performed for certain types of aircrafts whose engagement conditions for docking the cab 6 with the entrance allow for a margin of error. As another example, the present invention is applied to a case where LT=1 m and the travel distance is within the range of less than or equal to 1 m. In this case, straight traveling can be achieved more properly. In this case, automatic docking of the cab 6 with an aircraft entrance can be readily performed also for other types of aircrafts whose engagement conditions for docking the cab 6 with the entrance allow for a less margin of error. As yet another example, the present invention is applied to a case where LT=0.3 m and the travel distance is within the range of less than or equal to 0.3 m. In this case, extremely stable straight traveling can be achieved. In this case, automatic docking of the cab 6 with an aircraft entrance can be readily performed for almost all the types of aircrafts, including aircrafts whose engagement conditions for docking the cab 6 with the entrance allow for little margin of error. The movement start position may be a position of the travel unit 12 after the travel unit 12 has been moved by any means or by any cause, or may be a position that the travel unit 12 passes while moving.

It should be noted that, in the present embodiment, at the movement start position (e.g., standby position), an image of the door 3a is captured by the door image capturing camera 21, and the door 3a is detected from the image. Then, the target position is calculated. Alternatively, for example, the cab 6 may be mounted with a laser sensor. The door 3a may be detected by using the laser sensor, and then the target position may be calculated.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

INDUSTRIAL APPLICABILITY

The present invention is useful, for example, as a method of controlling traveling of a passenger boarding bridge, the method making it possible to cause a travel unit of the passenger boarding bridge to properly perform straight traveling from a movement start position to a destination position.

REFERENCE CHARACTERS LIST

1 passenger boarding bridge
3 aircraft
3a entrance door
4 rotunda
5 tunnel unit
6 cab
9 drive wheel
10 lifting/lowering mechanism
12 travel unit
21 door image capturing camera
22, 23 distance sensor
50 control device
51 door position calculator
24 rotunda angle sensor
26 travel unit angle sensor
27 inclination angle measurer
28 horizontal distance measurer

The invention claimed is:

1. A method of controlling traveling of a passenger boarding bridge, the passenger boarding bridge including:
a rotunda connected to a terminal building and rotatable in regular and reverse directions about a vertical axis;
a tunnel unit whose proximal end is connected to the rotunda in such a manner that the tunnel unit is liftable and lowerable, the tunnel unit being configured to be extendable and retractable in a longitudinal direction;
a cab provided at a distal end of the tunnel unit;

a lifting/lowering mechanism mounted to the tunnel unit or the cab and configured to lift and lower the tunnel unit or the cab;

a travel unit mounted below the lifting/lowering mechanism, the travel unit being configured to travel on a ground and rotate in regular and reverse directions about an axis that passes through a center point of the travel unit, such that a travel direction of the travel unit is changeable;

a rotunda angle sensor that detects a rotational angle of the rotunda;

a travel unit angle sensor that detects a rotational angle of the travel unit;

a horizontal distance measurer that measures a horizontal distance from the vertical axis to the center point of the travel unit; and an inclination angle measurer that measures an inclination angle of the tunnel unit relative to a horizontal plane, the method comprising, at a time of docking the cab with an entrance of an aircraft:

a step of calculating relative positional information indicating a position of the entrance as seen from the cab when the travel unit is at a movement start position;

a step of calculating positional information of a destination position, the destination position being a position to which the travel unit is moved for docking the cab with the entrance, based on positional information of the travel unit at the movement start position and the relative positional information of the entrance in a case where a distance from the movement start position to the destination position is in a predetermined state in which the distance is less than the horizontal distance from the vertical axis to the center point of the travel unit at the movement start position;

a step of calculating a target travel angle that is an angle formed by a direction extending linearly from the movement start position toward the destination position and a particular direction; and a traveling step of:
  causing the travel unit to travel from the movement start position toward the destination position;
  calculating, at predetermined time intervals during traveling of the travel unit, a travel angle that is an angle formed by a current travel direction of the travel unit and the particular direction; and
  controlling the travel unit by taking only the travel angle into account, such that the travel angle is kept to the target travel angle, wherein the step of calculating the positional information of the destination position includes calculating positional information of the movement start position based on the horizontal distance from the vertical axis to the center point of the travel unit, the horizontal distance being measured by the horizontal distance measurer, the rotational angle of the rotunda detected by the rotunda angle sensor, and the inclination angle measured by the inclination angle measurer, and the traveling step includes calculating the travel angle based on the rotational angle of the travel unit detected by the travel unit angle sensor and the rotational angle of the rotunda detected by the rotunda angle sensor.

2. The method of controlling traveling of a passenger boarding bridge according to claim 1, wherein
the destination position is a position of the travel unit when the cab is docked with the entrance.

3. The method of controlling traveling of a passenger boarding bridge according to claim 1, wherein
the step of calculating the relative positional information includes:
  detecting the entrance based on an image of the entrance, the image being captured by a camera mounted to the cab; and
  calculating the relative positional information of the detected entrance.

4. The method of controlling traveling of a passenger boarding bridge according to claim 1, wherein
the travel unit includes two drive wheels that are arranged parallel to each other, with the center point of the travel unit positioned therebetween, the two drive wheels being drivable to rotate independently of each other, and
the traveling step includes controlling the travel unit by adjusting a rotation speed of each of the two drive wheels.

5. The method of controlling traveling of a passenger boarding bridge according to claim 1, wherein
in the step of calculating the positional information of the destination position, the predetermined state is a state in which the distance from the movement start position to the destination position is less than or equal to a predetermined distance that is less than the horizontal distance from the vertical axis to the center point of the travel unit in a case where the tunnel unit is fully retracted.

6. The method of controlling traveling of a passenger boarding bridge according to claim 1, the method further comprising:
a step of moving the travel unit to a point that is closer to the destination position such that the distance from the movement start position to the destination position becomes the predetermined state in a case where the distance is not in the predetermined state and calculating the positional information of the destination position with the point set as a new movement start position.

7. The method of controlling traveling of a passenger boarding bridge according to claim 1, wherein
the distance from the movement start position to the destination position is not greater than one-fifth of the horizontal distance from the vertical axis to the center point of the travel unit at the movement start position.

* * * * *